United States Patent

Leitner

[15] 3,694,773

[45] Sept. 26, 1972

[54] TONE BURST GENERATOR

[72] Inventor: Richard E. Leitner, 8853 West Florida, Denver, Colo. 80226

[22] Filed: Jan. 20, 1971

[21] Appl. No.: 107,929

Related U.S. Application Data

[63] Continuation of Ser. No. 823,913, May 12, 1969, abandoned.

[52] U.S. Cl...................331/112, 331/68, 331/117 R, 331/174

[51] Int. Cl...................................................H03k 3/30

[58] Field of Search....331/68, 111, 112, 117 R, 146, 331/148, 173, 174

[56] References Cited

UNITED STATES PATENTS

| | | | |
|---|---|---|---|
| 3,467,887 | 9/1969 | Skirvin | 331/112 X |
| 2,836,724 | 5/1958 | Kaminow | 331/174 X |

OTHER PUBLICATIONS

Calvert, " Simple Metal Locator," Electronics World, Vol. 66, pp. 73, July 1961.

*Primary Examiner*—Roy Lake
*Assistant Examiner*—Siegfried H. Grimm
*Attorney*—Duane C. Burton

[57] ABSTRACT

A tone burst generator that produces a tone burst at predetermined intervals and operates at low voltage and current levels is described. The tone burst generator comprises a transistorized feedback oscillator circuit that includes a transformer having it's primary and secondary windings connected in series in the feedback path. The frequency of the tone burst is determined by the inductance value of the transformer and the capacitance value of a first capacitor connected in parallel with the secondary winding of the transformer. The tone burst interval is determined by the capacitance value of a second capacitor connected in series with the transformer windings.

6 Claims, 3 Drawing Figures

INVENTOR
RICHARD E. LEITNER

BY Sheridan, Ross & Burton
ATTORNEYS

TONE BURST GENERATOR

This application is a continuation of Ser. No. 823,913, filed May 12, 1969, now abandoned.

BACKGROUND OF THE INVENTION

This application is a continuation of U.S. Pat. Application Ser. No. 823,913, filed May 12, 1969 by Richard E. Leitner, and entitled "Tone Generator," now abandoned.

This invention is generally related to tone generators and more particularly to tone burst generators that produce tone bursts at predetermined intervals.

Various types of tone burst generators have been proposed and are in use. One such type is described in U.S. Pat. No. 2,836,724 to Kaminow for "Self-Quenching Oscillator." While tone burst generators have widespread use, relatively uncomplicated tone burst generators of the type contemplated by this invention are primarily useful in identifying, measuring signal levels, and checking noise and crosstalk on cable pairs, communication lines and conductors. These uses may be performed at remote and isolated locations as well as at near and easily accessible locations.

While prior art tone generators have proven to be somewhat satisfactory in use, they have several undesirable features. For example, many of them draw more than a minimal amount of current and require relatively high voltage sources. Because of their high power requirements, the life time of the batteries operating the tone burst generators is limited. In addition, they require switches to disconnect their power supplies to prolong the life thereof. While such switches are satisfactory in some environments they are not in others, such as remote locations where it is desirable to continuously operate the tone burst generator. Further, many prior art tone burst generators utilize more than a minimal number of components. Hence, they are more expensive to produce than is desirable. Moreover, because of the multitude of components, they are more subject to failure than is a tone burst generator having a lesser number of components.

Therefore, it is an object of this invention to provide a new and improved tone burst generator that produces a tone burst at predetermined intervals.

It is a further object of this invention to provide a new and improved tone burst generator that operates at relatively low voltage and current levels.

It is a still further object of this invention to provide a new and improved tone burst generator that is formed of a minimal number of circuit components.

SUMMARY OF THE INVENTION

In accordance with principles of this invention a tone burst generator that produces a tone burst at predetermined intervals is provided. The tone burst generator operates at low voltage and current levels; that is, the tone burst generator operates at low voltage levels and draws a minimal amount of current. The tone burst generator comprises a transistorized oscillator circuit. The frequency of the tone bursts is generally determined by the inductance value of a transformer forming a part of the oscillator circuit and the value of a capacitor connected in parallel with the secondary coil of the transformer. The tone burst interval is generally determined by the value of a capacitor, which also forms a part of the oscillator circuit, and is connected in series with the frequency determining capacitor and transformer.

In accordance with further principles of this invention, the oscillator circuit uses a minimal number of components—the two capacitors, the transistor and the transformer, plus a few resistors. In addition, if desired, the circuit can include an output transformer and an output isolation capacitor.

It will be appreciated from the foregoing brief summary of the invention that a tone burst generator that produces a tone burst at predetermined intervals and operates at low voltage and current levels is provided. In addition, to its low power requirements, the invention utilizes a minimal number of components. In fact, the overall oscillator can be entirely formed of less than eight components, depending upon the desired tone frequency. Hence, the invention is inexpensive to produce. Moreover, because it uses a minimal number of circuit elements, it is highly reliable. Finally, the invention is compact in that it can be encapsulated in a relatively small housing.

BRIEF DESCRIPTION OF THE DRAWINGS

The foregoing objects and many of the attendant advantages of this invention will become more readily appreciated as the same becomes better understood from the following detailed description when taken in conjunction with the accompanying drawings wherein.

DESCRIPTION OF THE PREFERRED EMBODIMENT

Figures 1, 2:
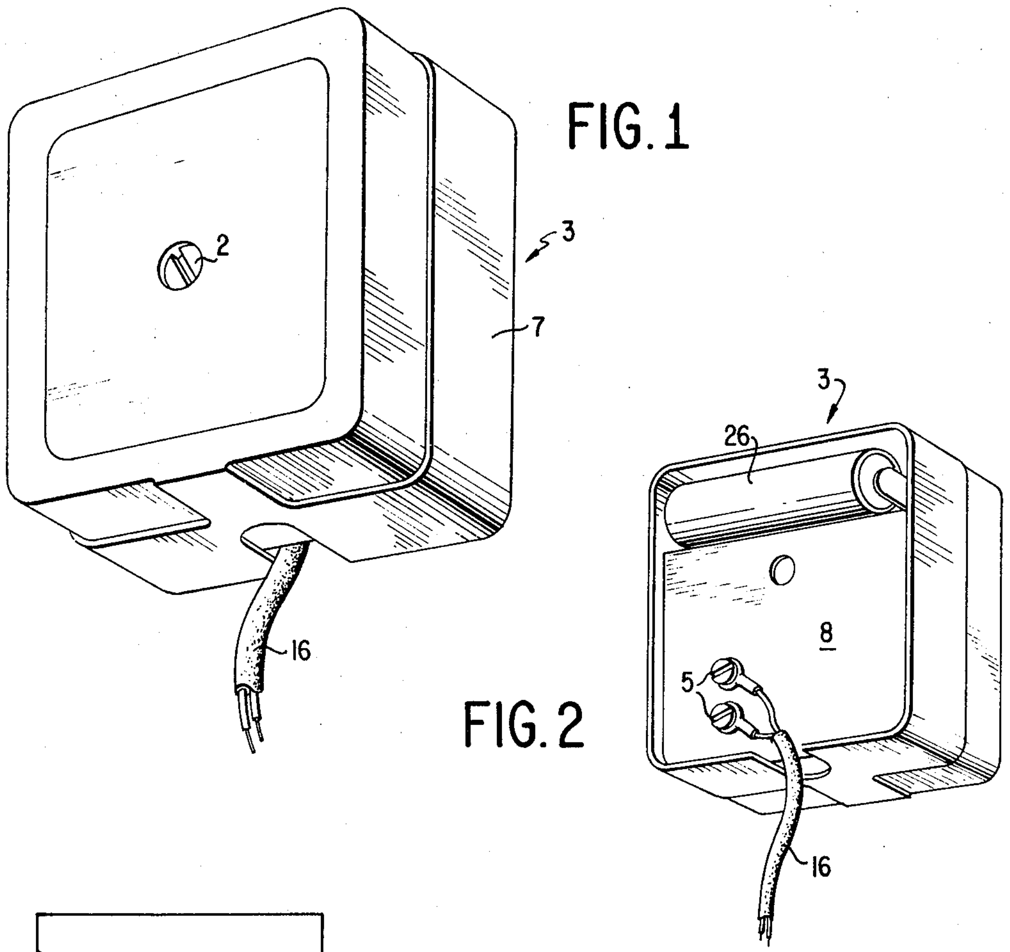
FIG. 1 is a pictorial diagram illustrating a housing suitable for encapsulating a tone burst generator formed in accordance with the invention.
FIG. 2 is a pictorial diagram of a rear view of the housing illustrated in FIG. 1; and, FIG. 3 is a schematic diagram of a preferred embodiment of the tone burst generator of the invention.

FIGS. 1 and 2 illustrate a small plastic case 3 suitable for housing a tone burst generator formed in accordance with the invention. The small plastic case 3 comprises a box shaped housing 7 and a bottom 8. A hole 2 is formed in the top of the box and is utilized to support the tone generator (which may be mounted on any suitable support, as desired). The bottom 8 allows sufficient room for a small battery 26 to be mounted inside of the box shaped housing 7. Output leads 16 are connected to a pair of output terminals 5 formed in the back 8 of the small plastic case 3.

It will be appreciated from the foregoing description and viewing FIGS. 1 and 2 that the housing is relatively small, yet it is suitable for housing a tone burst generator of the type hereinafter described.

Figure 3:
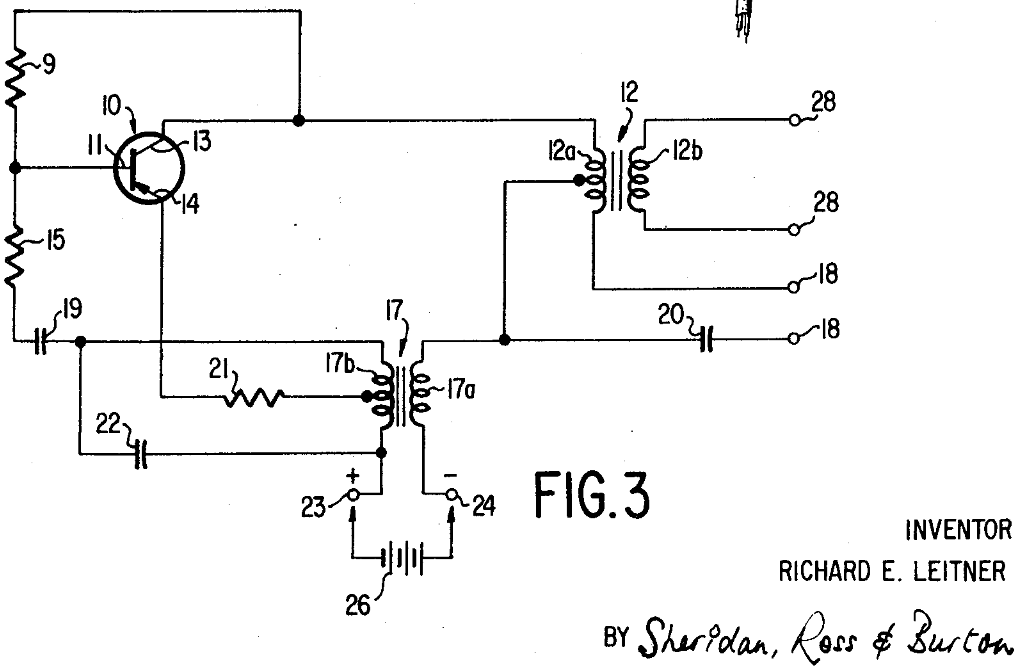

FIG. 3 is a schematic diagram illustrating a tone burst generator formed in accordance with the invention. The tone generator's main component is a PNP transistor 10. The circuit also includes: a transformer 17 having primary and secondary windings 17*a* and 17*b*, a switching capacitor 19; a tone capacitor 22; first, second and third resistors 9, 15 and 21; and the power source or battery 26. In addition, if desired, an output transformer 12 having primary and secondary windings 12*a* and 12*b* and an isolation capacitor 20 can be included.

The elements making up the tone burst generator are connected in the hereinafter described manner. The first resistor 9 is connected between the base 11 and the collector 13 of the PNP transistor 10. The battery 26 is connected in series with the primary and secondary windings of the transformer 17 via battery terminals 23 and 24. The second resistor 15 is connected in series with the switching capacitor 19 between the base 11 of the PNP transistor 10 and the other side of the secondary winding **17*b* of the transformer 17. The tone capacitor is connected in parallel with the secondary winding 17*b* of the transformer 17. The emitter 14 of the PNP transistor 10 is connected through the third resistor 21 to a center tap on the secondary winding 17*b* of the transformer 17**.

The other side of the primary winding **17*a* of the transformer 17 is connected to a center tap on the primary winding 12*a* of the output transformer 12. One end of the primary winding 12*a* of the output transformer 12 is connected to the collector 13 of the PNP transistor 10. The other side of the primary winding 12*a* of the output transistor 12 is connected to one terminal of a first pair of output terminals 18, 18. The center tap of the primary winding 12*a* of the output transformer 12 is connected through isolation capacitor 20 to the other terminal of the first pair of output terminals 18, 18. The secondary winding 12*b* of the output transformer 12 is connected to a second pair of output terminals 28, 28**.

In general, the capacitance value of the tone capacitor 22 and the inductance determined by the number of turns of the transformer 17 govern the burst frequency of the oscillator illustrated in FIG. 3 and formed in accordance with the invention. The resistance value of the second resistor 15 in conjunction with the capacitance value of the switching capacitor 19 determines the "on" time of the oscillator. And, the resistance value of the first resistor 9 in conjunction with the capacitance value of the switching capacitor 19 determines the "off" time of the oscillator. Hence, the values of these later components generally determine the burst intervals of the tone generator.

In essence, the portion of the oscillator circuit containing the transformer 17 provides a feedback path to sustain oscillations. This portion also provides the output signal since it is coupled to both sets of output terminals 18, 18 or 28, 28. Either pair of output terminals 18, 18 or 28, 28 can be connected to the output terminals 5 located on the back 8 of the small plastic case 3 illustrated in FIG. 2, depending upon whether transformer isolation is or is not desired.

The resistance value of the third resistor 21 determines the drain on the battery 26 and the voltage level of the tone bursts. That is, if the resistance value of resistor 21 is high, the voltage level of the output tone burst signal is relatively high because less resistance is contained in the output circuit (in addition, current drain is high). Alternatively, if the resistance value of resistor 21 is low the voltage level of the output tone burst signal is rather low (in addition, current drain is low).

Turning now to a more complete description of the operation of the tone generator illustrated in FIG. 3, the tone generator, as discussed above, is basically a feedback oscillator consisting of the PNP transistor 10, the switching capacitor 19, the second resistor 15 and the transformer 17. In essence, the secondary winding of the transformer 17 forms a tickler coil of an inductive nature which "tickles" the PNP transistor 10 to create oscillations of a suitable nature. The switching capacitor 19 and the second resistor 15 couple this tickler signal to the base electrode 11 of the PNP transistor 10 so that continuous oscillations occur during the "burst" period.

While the number of turns of wire in the primary and secondary windings **17*a* and 17*b* of the transformer 17 and the mutual inductance of the transformer 17 roughly fix the operating frequency of the oscillator, as will be appreciated by those skilled in the art and others, the collector current cut off point and the emitter current cut off point of the PNP transistor must also be considered. In addition, the resistance values of the first, second and third resistors must be taken into consideration. After considering these items, the value of the tone capacitor 22** is chosen so that a desired tone is obtained. In other words, the exact value of the tone capacitor will depend upon the value of the previously discussed components.

The switching periods or "on" and "off" times of the tone burst generator are generally controlled by the values of the switching capacitor 19 and the first and second resistors 9 and 15 and, to some extent the values of the elements forming the feedback portion of the generator. More specifically, when the battery 26 is connected to the battery terminals 23 and 24, a charge starts to build up on the switching capacitor 19. The charging circuit for the switching capacitor 19 includes the transformer 17, the upper (as viewed in FIG. 3) half of the primary winding 12a of the output transformer 12, and the first and second resistors 9 and 15. When the charge on the switching capacitor 19 reaches a potential level sufficient to bias the base 11 of the PNP transistor 10 on, the tone generator oscillates in the manner previously described and an output tone burst occurs. That is, when the voltage on capacitor 19 raises the potential on the base 11 of the transistor 10 to the point where it becomes negative with respect to the voltage on the emitter 14, the transistor 10 begins to conduct. Then, the oscillator oscillates at the frequency determined by the tone controlling elements previously described.

As soon as emission of the tone burst starts, the voltage on the switching capacitor 19 begins to drop; i.e., the switching capacitor 19 starts to discharge. The discharge path is through the second resistor 15 and the base-emitter circuit of the transistor 10. After a suitable period of time, the potential on the switching capacitor 19 reduces to a level where it will no longer sustain the transistor 10 in its "on" or conduction state. At this point the tone burst ends.

As soon as the tone burst ends, the switching capacitor's voltage again starts to build up to the point where it will bias the transistor 10 "on" and cause a second tone burst. Thereafter, another discharge occurs. In this manner, a sequence of tone bursts is provided. This operation continues as long as a proper voltage is applied to the battery terminals 23 and 24.

The build up time of the switching capacitor 19 (off time of the oscillator) is mainly determined by the values of the first resistor 9 and the switching capacitor 19. The length of time it takes the switching capacitor to discharge (on time of the oscillator) is mainly determined by the values of the second resistor 15 and the switching capacitor 19.

The tone burst generator of the invention has been found to consume only a very small leakage current during the off period of the oscillator. More specifically, the intermittent on and off operation of the oscillator has a pulse discharge effect upon the battery 26. Due to this pulse discharge effect, the service life of the battery 26 is extremely long, i.e., in the order of several months. Because of the long service life, it is unnecessary to include a disconnect switch in the battery supply circuit.

As previously described, the desired output level or amplitude of the tone bursts is mainly determined by the value of the third resistor 21. In other words, as the value of the third resistor goes up, the voltage level of the tone bursts increases and vice versa.

It will be appreciated from the foregoing description that the invention provides a small, low power generally solid state signal generator that will operate for many months on a single low voltage battery. In general, the invention consists of an oscillator that utilizes a minimal number of components and will operate continuously for an extended period of time, such as several months. The oscillator is automatically switched on and off to create tone bursts of a predetermined frequency at predetermined intervals. As indicated in FIGS. 1 and 2, the oscillator can be encapsulated in a small plastic case so that it will be resistant to moisture. In addition, it is rugged and light in weight.

It will be appreciated by those skilled in the art that the inventive device is suitable for widespread use by various individuals. For example, it can be utilized by communication companies to identify lines and conductors from remote and isolated locations to determine whether a troubled condition exists between the lines or conductors without the need of personnel at the remote location.

It also will be appreciated by those skilled in the art and others that while a preferred embodiment of the invention has been illustrated and described, various changes can be made therein without departing from the spirit and scope of the invention. Hence, the invention can be practiced otherwise than as specifically described herein.

The embodiments of the invention in which an exclusive property or privilege is claimed are defined as follows:

1. A tone burst generator suitable for encapsulation in a small, light weight case comprising:
- a transistor having base, collector and emitter terminals;
- a transformer having a primary winding and a secondary winding, said secondary winding being center tapped, said center tap being connected to the emitter terminal of said transistor;
- a tone capacitor connected in parallel with the secondary winding of said transformer;
- a power source, said power source being connected in series with the primary and secondary windings of said transformer; and,
- a switching capacitor, said series connected power source and primary and secondary windings of said transformer, and said switching capacitor, being connected in series between the collector and base terminals of said transistor.

2. A tone burst generator suitable for encapsulation in a small, light weight case as claimed in claim 1 including a first resistor connected between the base and collector of said transistor; and, a second resistor connected in series with said switching capacitor, said power source and said primary and secondary windings of said transformer, between said collector and base terminals of said transistor.

3. A tone burst generator suitable for encapsulation in a small, light weight case as claimed in claim 2 including a third resistor connected between the emitter terminal of said transistor and the center tap of said secondary winding of said transformer.

4. A tone burst generator suitable for encapsulation in a small, light weight case as claimed in claim 3 including an output transformer having a primary winding which is center tapped and a secondary winding, one half of said primary winding being connected in series with said series connected second resistor, switching capacitor, power source, and primary and secondary windings of said transformer; said secondary winding of said output transformer being connected to a pair of output terminals.

5. A tone burst generator suitable for encapsulation in a small, light weight case as claimed in claim 4 including:
- a second pair of output terminals, one of said output terminals being connected to the end of the other half of said primary winding of said output transformer; and,
- an isolation capacitor, said isolation capacitor being connected between the other terminal of said second pair of output terminals and the center tap of said output transformer.

6. A tone burst generator suitable for encapsulation in a small, light weight case as claimed in claim 1 including a resistor connected between the emitter terminal of said transistor and the center tap of said secondary winding of said transformer.

* * * * *